(12) United States Patent
de la Barré et al.

(10) Patent No.: US 8,358,335 B2
(45) Date of Patent: Jan. 22, 2013

(54) METHOD FOR DISPLAYING IMAGE INFORMATION AND AUTOSTEREOSCOPIC SCREEN

(75) Inventors: René de la Barré, Mittweida (DE); Silvio Jurk, Crosta (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 518 days.

(21) Appl. No.: 12/627,260

(22) Filed: Nov. 30, 2009

(65) Prior Publication Data

US 2011/0128356 A1  Jun. 2, 2011

(51) Int. Cl.
*H04N 13/04* (2006.01)
(52) U.S. Cl. .............................. 348/54; 348/51; 345/419
(58) Field of Classification Search .................... 348/48, 348/51, 169; 345/419
See application file for complete search history.

(56) References Cited

U.S. PATENT DOCUMENTS

| | | | |
|---|---|---|---|
| 6,307,585 B1 | 10/2001 | Hentschke | |
| 2009/0123030 A1 | 5/2009 | De La Barre et al. | |
| 2009/0278936 A1* | 11/2009 | Pastoor et al. | 348/169 |
| 2010/0295928 A1* | 11/2010 | De La Barre et al. | 348/51 |
| 2011/0216061 A1 | 9/2011 | De La Barre et al. | |
| 2011/0216171 A1 | 9/2011 | De La Barre et al. | |

FOREIGN PATENT DOCUMENTS

| | | |
|---|---|---|
| DE | 10043305 | 3/2002 |
| DE | 102006031799 B3 | 1/2008 |
| EP | 0877966 B1 | 11/1998 |
| EP | 1689162 A2 | 8/2006 |
| WO | WO2009095862 A1 | 8/2009 |

OTHER PUBLICATIONS

International Search Report issued in PCT/EP2010/007441, mailed Mar. 16, 2011, 3 pages.

\* cited by examiner

*Primary Examiner* — Abdullahi Salad
(74) *Attorney, Agent, or Firm* — Faegre Baker Daniels LLP

(57) ABSTRACT

The invention relates to a method for displaying image information in which pixels of a matrix screen (21) are actuated as a function of the image information (30) of a plurality of more than two different mutually complementary stereoscopic half-images such that each of the half-images is reproduced with a large number of image points on one of different sub-groups of the pixels and light emanating from each of these sub-groups of pixels is conducted through a beam splitter grid (22) into a region (31, 32, 33, 34) which is assigned to this sub-group, from which region only the half-image reproduced by this sub-group is visible, eye positions of respectively two eyes of at least two viewers (27, 28, 29) being determined and the sub-groups of pixels, on which respectively one of the half-images is reproduced, being chosen as a function of the detected eye positions such that the eyes of each of the at least two viewers (27, 28, 29) are situated in two of the mentioned regions (31, 32, 33, 34) from which two mutually complementary stereoscopic half-images are visible. The invention relates furthermore to a corresponding autostereoscopic screen.

12 Claims, 4 Drawing Sheets

METHOD FOR DISPLAYING IMAGE INFORMATION AND AUTOSTEREOSCOPIC SCREEN

BACKGROUND

The invention relates to a method for displaying image information on an autostereoscopic screen with a matrix screen which has a large number of pixels and with a beam splitter grid which is disposed in front of the matrix screen. The invention relates furthermore to a corresponding autostereoscopic screen which is suitable for simultaneous display of a large number of views which are visible respectively from at least one of several laterally offset viewing zones.

SUMMARY

Screens of this type which are also termed autostereoscopic displays are known in particular as so-called multiuser displays or multiperson screens. In the case of a conventional mode of operation, a large number of four or more mutually complementary stereoscopic half-images is reproduced on such screens so that also several persons can perceive a reproduced scene three-dimensionally. Generic screens comprise for this purpose, in addition to a matrix screen with a large number of pixels, a beam splitter grid which is disposed in front of the matrix screen and is designed to direct light emanating from the pixels respectively into at least one of the viewing zones. They thereby differ from so-called single view displays which are suitable only for reproducing two stereoscopic half-images and on which only a single viewer can see stereo images of satisfactory quality, whilst a further person who is offset laterally relative to this viewer cannot even see a mono image.

Operation of such multiperson screens in the manner known from the state of the art (a conventional multiview method) requires however firstly that image information of a correspondingly large number of views is present. These must be photographed either by a correspondingly large number of cameras which are disposed offset laterally, which involves great technical complexity and in particular the requirement for unwieldy camera systems, or they must be determined, in a likewise complex manner, by computer from the image information of only two stereoscopic half-images. Furthermore, only very restricted reproduction quality can thereby be achieved because interfering crosstalk of adjacent image channels cannot be avoided in practice and because the persons viewing the screen see precisely two half-images, which fit together correctly to form a stereo image, only in specific positions. Since, however, a viewer typically moves at least slightly, the stereo image cannot be viewed therefore by any of the mentioned persons with satisfactory ease.

The object therefore underlying the invention is to propose a method for displaying image information in which several persons can see stereo images of a scene reproduced on a screen comfortably with comparatively good image quality, the complexity associated with producing a large number of complementary half-images of the same scene being intended to be reduced at the same time. Furthermore, the object underlying the invention is to develop a screen which is suitable for implementing such a method.

This object is achieved according to the invention by a method having the features of the independent method claim and also by an autostereoscopic screen having the features of the independent product claim. Advantageous embodiments and developments of the invention are revealed in the features of the dependent claims.

There is therefore proposed a method for displaying image information on an autostereoscopic screen with a matrix screen which has a large number of pixels and with a beam splitter grid which is disposed in front of the matrix screen, the pixels being actuated thus as a function of the image information of a plurality of more than two different mutually complementary stereoscopic half-images such that each of the half-images is reproduced with a large number of image points on one of different sub-groups of pixels and such that light emanating from each of these sub-groups of pixels is conducted through the beam splitter grid into a region which is assigned to this sub-group, from which region only the half-image reproduced by this sub-group is visible, furthermore eye positions of respectively two eyes of at least two viewers being determined and the sub-groups of pixels, on which respectively one of the half-images is reproduced, being chosen as a function of the detected eye positions such that the eyes of each of the at least two viewers are situated in two of the mentioned regions from which two mutually complementary stereoscopic half-images are visible. The pixels can thereby also be provided by sub-pixels from which, even during normal operation of the matrix screen, respectively a plurality thereof are combined to form one image point.

Various advantages are achieved with the described features. On the one hand, fewer stereoscopic half-images are required for this method than in the case of multiperson screens corresponding to a conventional mode of operation, which reduces the complexity when producing the image information. It thereby suffices if the plurality of half-images is only greater by one than a number of viewers whose eye positions are intended to be determined and who are intended to be able respectively to see a stereo image of a reproduced scene. Furthermore, these viewers see the stereo images with better quality than in the case of a conventional multiview method in which crosstalk of adjacent half-images cannot be avoided.

Further advantages can be seen in the fact that the viewers can approach the screen more closely without losing the 3D effect than is possible with a conventional operation of such screens. A change in distance of one of the viewers relative to the screen, for example an approach to the screen, advantageously thereby has the consequence of not limiting the possible viewing distances for the at least one further viewer. With the described method, a movement of each of the viewers can thereby be tracked as long as they are not already obscuring each other's view. Finally, the proposed method does not necessarily exclude combination thereof with other 3D modes, whether in that the screen can be operated optionally also in a different mode or in that parts of the matrix screen are actuated differently.

With respect to minimisation of the number of complementary half-images required, it is particularly advantageous if the sub-groups are chosen such that a right eye of at least one of the viewers is situated in the same one of the mentioned regions as a left eye of another of the viewers. For the same purpose, even with a fairly large number of viewers seeing stereo images, it can be provided that, with the exception of two of the regions from which precisely one of the half-images is visible, a right eye of one of the viewers and a left eye of another of the viewers is situated in each of these regions.

In order to avoid crosstalk between mutually complementary half-images which are visible from adjacent regions, at least two of the sub-groups—possibly also all of the sub-groups—can be chosen such that respectively at least one pixel is blanked between adjacent image points from two different ones of these sub-groups.

Ease of viewing and a perceived quality of the stereo images can be improved if the pixels within the image points are actuated with an intensity which is weighted in addition to the image information such that intensity maxima and/or intensity concentrations are congruent with the eye positions.

The eye positions can be determined simply in that a head position of each of the viewers is detected and the eye positions of each of the viewers are derived from the head position of this viewer. Alternatively, it is also possible to detect the eye positions directly, e.g. by a correspondingly efficient image evaluation of a camera system used to determine the eye positions. Methods which are known per se in the context of so-called tracking of screen viewers can thereby be applied.

In order to allow viewers a movement within as wide limits as possible without the viewers thereby losing the respective stereo image, a lateral movement of the eye positions of at least one of the viewers and/or a change in distance of the eye positions relative to the matrix screen can correspondingly be detected and the actuation of the pixels of the matrix screen is changed as a function of the lateral movement or the change in distance, in that limits of the sub-groups and limits of image points reproduced by these sub-groups are moved such that the eyes of this viewer remain in the same regions. The image points which are typically formed from respectively a plurality of pixels can thereby be moved laterally according to requirement and/or their size can be changed and/or a lateral spreading, with which the image points are distributed over the matrix screen, can be changed.

In addition, it is conceivable, with a movement of one or more of the viewers, also to change the stereoscopic half-images themselves in that they are adapted to a perspective which is changed corresponding to the eye positions.

The described method can be further developed in that the mentioned sub-groups on which the half-images are reproduced do not cover all of the pixels of the matrix screen whilst, on the remaining pixels, at least one other image which can be perceived by a further viewer is reproduced. It is accordingly possible in particular that only a partial region of the matrix screen is operated in the above-described manner, whilst one or more other regions are operated according to another method.

The described method can be implemented with an autostereoscopic screen of the proposed type. Such an advantageous screen has, in addition to the already mentioned features, a control unit for actuating the matrix screen, which control unit is designed to actuate the matrix screen as a function of image information of a plurality of more than two mutually complementary stereoscopic half-images such that each of the half-images is reproduced with a large number of image points on one of different sub-groups of the pixels and such that light emanating from each of these sub-groups is conducted through the beam splitter grid into a region assigned to this sub-group, from which region only the half-image reproduced by this sub-group is visible, the mentioned plurality of half-images being smaller than the large number of views which the screen is able to display. The screen thereby also has a device for determining respectively two eye positions of at least two viewers, the control unit being designed by programming technology in addition to choose the mentioned sub-groups during actuation of the matrix screen as a function of the detected eye positions such that the two eye positions of each of the at least two viewers are situated in two of the mentioned regions from which two mutually complementary stereoscopic half-images are visible. The control unit can thereby be designed in addition of course to actuate the matrix screen corresponding to the advantageous embodiments of the method, described further back.

BRIEF DESCRIPTION OF THE DRAWINGS

Embodiments of the invention are explained subsequently with reference to FIGS. 1 to 4. There are shown FIG. 1 in a schematic representation, a plan view on a screen which comprises a matrix screen and a beam splitter grid and on which image information which can be perceived by three viewers autostereoscopically is displayed, FIG. 2 in a representation corresponding to FIG. 1, the same screen after a lateral movement of one of the viewers, FIG. 3 in a corresponding representation, the same screen after a movement of this viewer towards the screen and FIG. 4 in a corresponding representation, once again the same screen which is actuated here in a slightly different manner.

DETAILED DESCRIPTION

Figure 1:
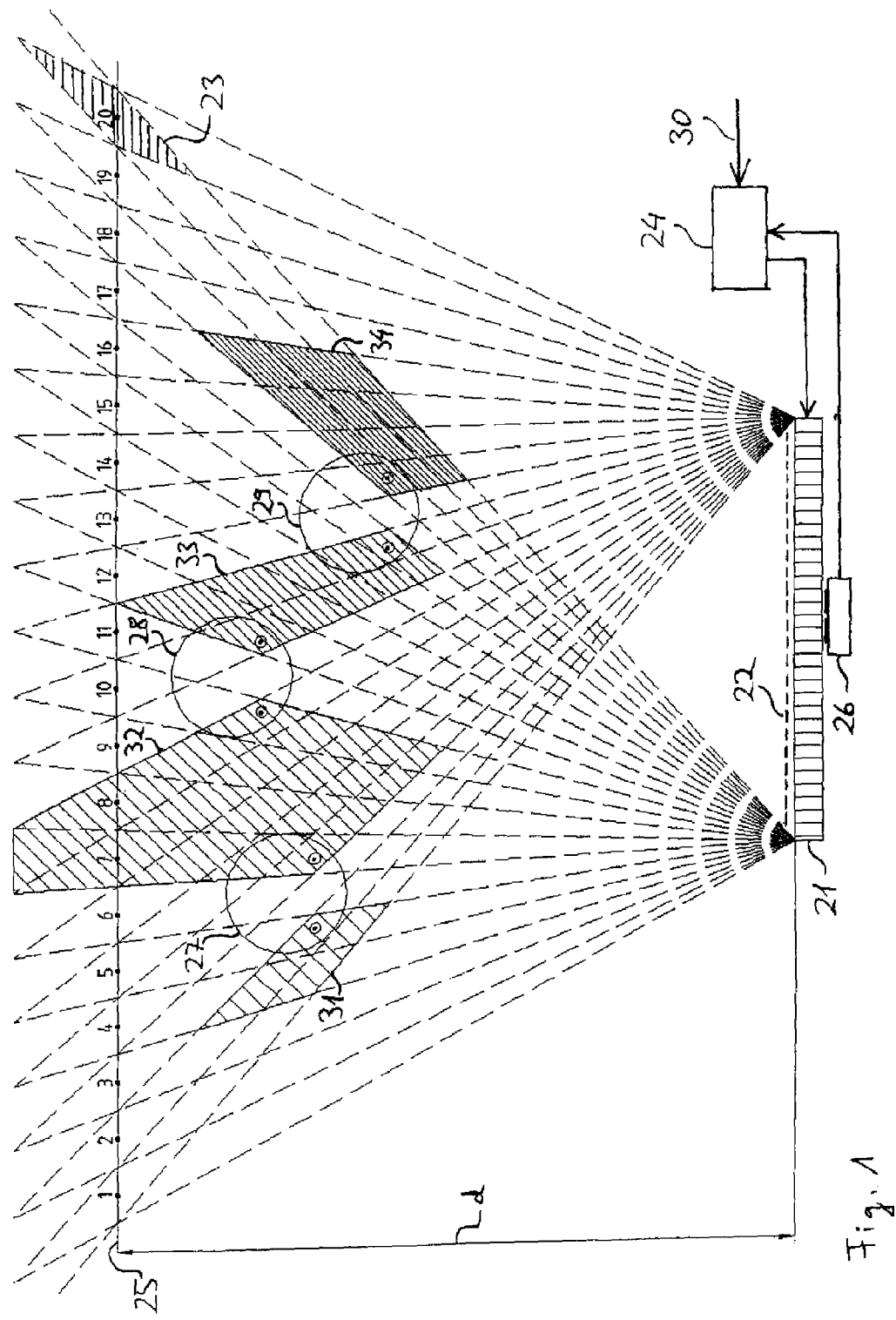

In FIG. 1, a screen is therefore represented, which is conceived as an autostereoscopic screen and which has a matrix screen 21 with a large number of sub-pixels and a beam splitter grid 22 disposed in front of the matrix screen 21, which grid is suitable for directing light emanating from the sub-pixels of the matrix screen 21 respectively into one of a large number of laterally offset viewing zones 23. These viewing zones 23 are numbered here and correspondingly twenty image channels 1 to 20 of the screen.

The matrix screen 21 concerns a liquid crystal screen which has a large number of sub-pixels in a large number of lines, respectively red, green and blue sub-pixels alternating in each line in a cyclical sequence. Instead, e.g. an OLED display could also be used. Each image point reproduced on the matrix screen 21 is formed by a pixel group of a plurality of sub-pixels and extends over three lines so that, independently of the width of the image point or of the pixel group, any desired colour can be reproduced in true-colour.

The beam splitter grid 22 which can also be termed barrier grid, can be configured for example as a cylinder lens grid or as a simple slot grid or grating, slots or cylinder lenses of the beam splitter grid 22—a corresponding arrangement of the coloured sub-pixels being a precondition—being preferably inclined by approx. 20 degrees from a vertical line. In the case of other embodiments, the beam splitter grid 22 can also be configured as a step grid, perforated grid or ball lens grid.

Finally, the screen has a control unit 24 which is designed by programming technology to actuate the matrix screen 21 and can actuate the sub-pixels of the matrix screen 21 as a function of image information of various stereoscopic half-images so that each of the stereoscopic half-images is reproduced with a large number of image points on one of correspondingly many sub-groups of the sub-pixels of the matrix screen 21.

In one operating mode which is not in the focus of interest at present, the screen can be operated as a conventional multiperson screen in that, on the sub-pixels of the matrix screen 21 in a cyclical sequence, image information of twenty mutually complementary stereoscopic half-images is reproduced so that, from each of the laterally offset viewing zones 23 respectively, precisely one of these stereoscopic half-images is visible. In a plane 25 which is at a distance from the matrix screen 21 by a nominal viewing distance d and in which the viewing zones 23 have a maximum width (typically a width of slightly less than an average eye distance of 65 mm), several persons can then perceive autostereoscopic stereo images of the same scene at the same time.

Another method for displaying image information on the autostereoscopic screen is intended to be described here. It can thereby be provided that the control unit 24 allows switching-over between the above-sketched conventional display method and the subsequently described method. In order to implement this method, the screen has a device 26 for determining respectively two eye positions of, in the present case, three viewers.

This device 26 can be produced for example with two video cameras which are disposed laterally offset and an image analysis programme which is known per se. It is thereby conceivable that the device 26 directly detects the eye positions by means of a corresponding efficient image analysis programme. As an alternative thereto, it is also possible that the eye positions of the viewers 27, 28 and 29 are determined by the device 26 in that firstly only one head position of each of the viewers 27, 28 and 29 is detected and the eye positions of each of the viewers 27, 28 and 29 are then derived from the head position of this viewer 27, 28 or 29 on the basis of the known average eye distance of 65 mm and a typical average height position of the eyes in the face of the respective viewer 27, 28 or 29.

The control unit 24 is now designed by programming technology to actuate the matrix screen 21 as a function of the eye positions of the viewers 27, 28 and 29 which are then transmitted to the control unit 24 from the device 26 for this purpose. The sub-pixels of the matrix screen 21 are thereby actuated as a function of the image information 30 of, in the present case, four different mutually complementary stereoscopic half-images such that each of these four stereoscopic half-images is reproduced on one of four different sub-groups of sub-pixels, these sub-groups being chosen as a function of the detected eye positions such that light emanating from each of these sub-groups of sub-pixels impinges through the beam splitter grid 22 into one of four different regions 31, 32, 33 and 34, from which only the half-image reproduced by this sub-group is visible, and such that the two eyes of each of the viewers 27, 28 and 29 are situated in two of the mentioned regions 31 to 34. The right eye of the viewer 27 is situated, in FIG. 1, in the left region 31 and the left eye of this viewer 27 in the adjacent region 32, whilst the right eye of the centrally positioned viewer 28 is likewise situated in this region 32 and the left eye of the viewer 28 in the next region 33. The right eye of the viewer 29 positioned far right in FIG. 1 is situated in turn in the region 33 in which the left eye of the viewer 28 is situated, whilst the left eye of the viewer 29 is situated in the region 34 located far right in FIG. 1. The four stereoscopic half-images, of which from each of the regions 31 to 34 respectively precisely one is visible, are thereby chosen such that the half-images which are visible from the regions 31 and 32 produce a stereo image which can be perceived autostereoscopically for the viewer 27, whilst the half-images visible from the regions 32 and 33 complement each other to form a stereo image visible for the viewer 28 and the half-images visible from the regions 33 and 34 to form a stereo image of the same scene which is visible for the observer 29. The half-image visible from the region 32 thereby serves as left half-image for the viewer 27 and as right half-image for the viewer 28 whilst the half-image visible from the region 33 forms a left half-image for the viewer 28 and a right half-image for the viewer 29.

On each of the mentioned sub-groups of sub-pixels of the matrix screen 21, a large number of image points which form respectively one of the stereoscopic half-images is reproduced. These image points are, as a function of the eye positions of the viewers 27 to 29, thereby formed by sub-pixel groups of different sizes. As can be detected in FIG. 1, the sub-groups are chosen thereby such that respectively one sub-pixel between adjacent image points from two different ones of these sub-groups is blanked. As a result, crosstalk between different half-images is avoided. In addition, the sub-pixels within the image points including in each line typically a plurality of sub-pixels can be actuated with an intensity which is weighted in addition to the corresponding image information 30 such that intensity maxima or intensity concentrations are congruent with the eye positions of the viewers 27 to 29.

In the situation shown in FIG. 1, the viewers 27, 28 and 29 are situated in front of the plane 25 such that their eyes adopt a smaller spacing from the matrix screen 21, relative to the nominal viewing distance d. The image information 30, spread laterally, is therefore written into the matrix screen 21. This is detected for example in that the region 34, situated far right in FIG. 1, in which the left eye of the viewer 29 is situated is illuminated at the right image edge, viewed by the observer 29, by the sub-pixels which, during normal operation of the screen, are assigned as multiperson screen to the image channels 18, 19 and 20 whilst this region 34 at the opposite left image edge is illuminated by the sub-pixels which are occupied by the image channels 13 to 16 in the case of a normal multiview operation. The same applies for the other regions 31, 32 and 33.

Figure 2:
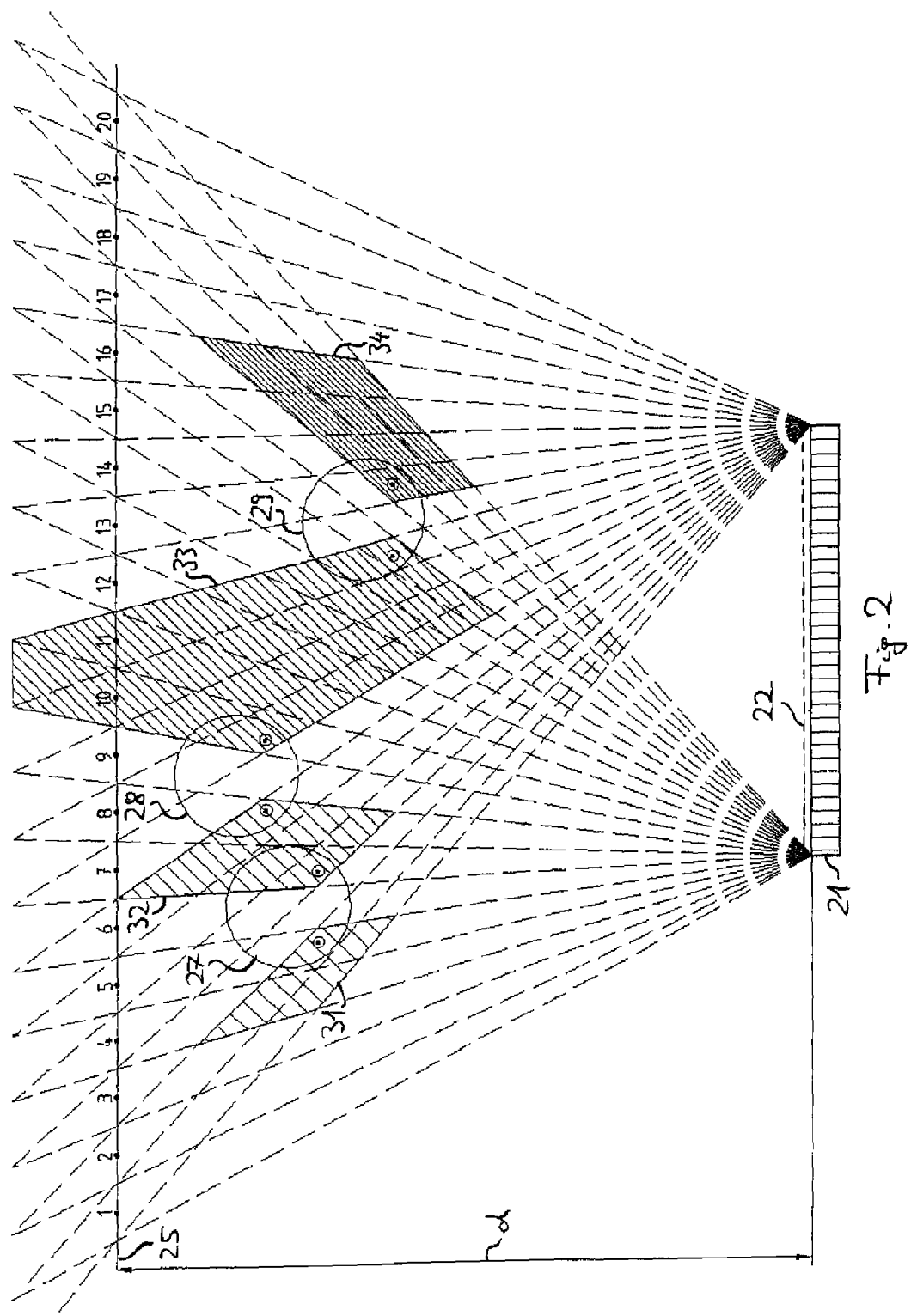
Figure 3:
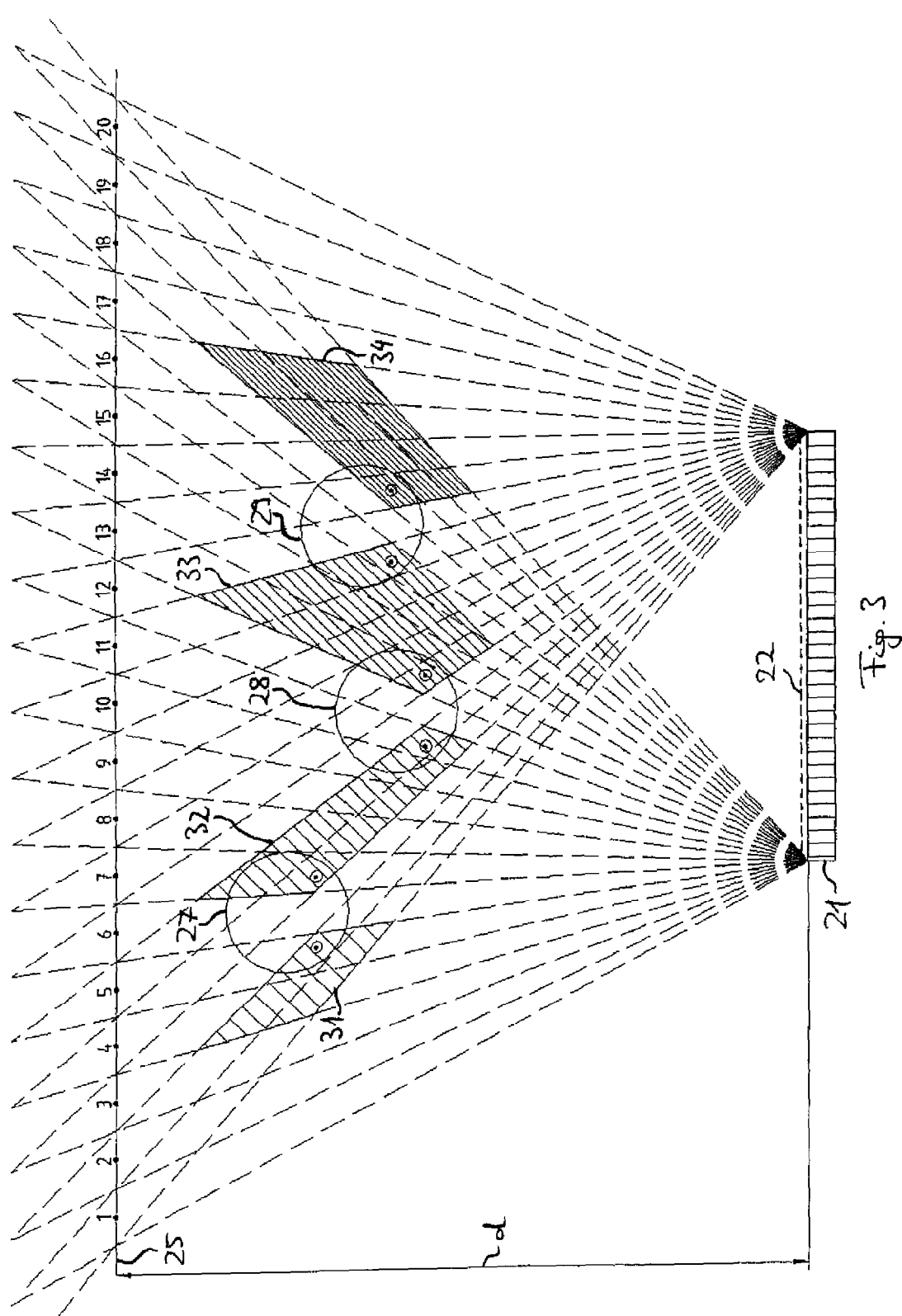

In FIGS. 2 and 3, the same screen and the three viewers 27, 28 and 29 are once again displayed in respectively another situation, recurrent features, as also in FIG. 4, being provided again with the same reference numbers. For the sake of simplicity, the control unit 24 and the device 26 are not illustrated in FIGS. 2 to 4.

The situation illustrated in FIG. 2 differs from the situation of FIG. 1 in that the viewer 28 has moved laterally. A lateral movement of the eye positions of this viewer 28, associated therewith, is thereby detected with the help of the above-described device 26. It is detectable in FIG. 2 how the actuation of the matrix screen 21 is changed by the control unit 24 as a function of the detected movement such that the right eye of the viewer 28 remains, despite his movement, in the region 32 and his left eye in the region 33. For this purpose, the region 32 is made smaller, whilst the region 33 is enlarged. This takes place in turn in that limits of the sub-groups, to which these two regions 32 and 33 are assigned, and limits of the image points contained in these sub-groups are moved in that sub-pixels, which were assigned previously to one of these sub-groups, are blanked in the course of the movement or are assigned to an image point of the other sub-group.

In FIG. 3, what takes place on the matrix screen 21 during a movement of the viewer 28 is illustrated. In this case also, the limits of the sub-groups of sub-pixels, on which respectively one of the half-images is reproduced, is moved by a corresponding actuation by means of the control unit 24 such that the eyes of the viewers 27, 28 and 29 respectively remain in the same two regions 31 and 32, 32 and 33 or 33 and 34. For this purpose, the movement of the viewer 28 is detected with the device 26 which transmits information relating to the detected movement as an output signal to the control unit 26. Correspondingly, the same procedure takes place of course during a movement of the viewers 27 and 29.

During actuation of the matrix screen in the manner shown in FIGS. 1 to 3, finally also a further viewer, about whom no head position or eye position is determined, could nevertheless see a mono image. This would apply for example to a further viewer who, in FIG. 1, would be positioned behind the viewers 27 and 29 and would look between these.

Figure 4:
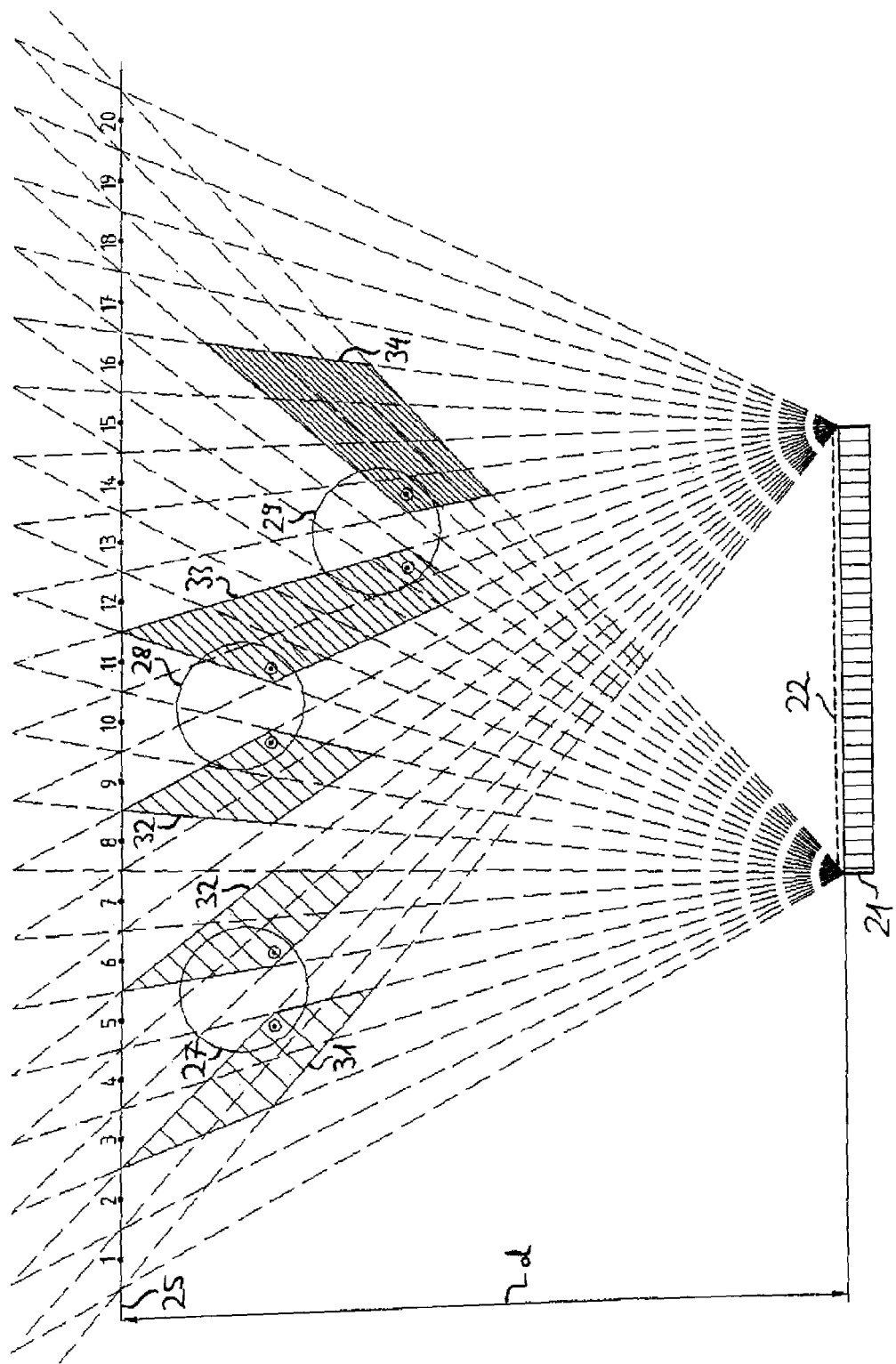

In FIG. 4, another type of actuation of the matrix screen 21 is illustrated, which differs from the above-described examples only in that the region 32 is split into two separate sub-regions, which is produced by blanking respectively one sub-pixel in each row of each image point of the corresponding sub-group.

In a modification of this case, these two sub-regions could also form two independent regions from which two different half-images are visible. Since then none of the half-images which the viewer 27 sees could be seen also by one of the other viewers 28 or 29, it could be provided in addition in this case that the two half-images perceived by the viewer 27 are changed during a movement of this viewer 27 himself and are adapted to a perspective altered with the eye positions of the viewer 27. Finally, it is also possible to actuate the matrix screen 21 such that the viewer 27 sees an entirely different scene in that the sub-pixels which can be seen by the viewer 27 are actuated as a function of image data of this other scene, and in fact possibly again in the form of two mutually complementary half-images so that, here also, the viewer 27 sees one—even if different in content—stereo image.

The invention claimed is:

1. A method for displaying image information on an autostereoscopic screen with a matrix screen which has a large number of pixels and with a beam splitter grid which is disposed in front of the matrix screen, the method comprising the following steps;
   determining eye positions of respectively two eyes of at least two viewers; and
   actuating the pixels as a function of the image information of a plurality of more than two different mutually complementary stereoscopic half-images such that each of the half-images is reproduced with a large number of image points on one of different sub-groups of pixels and light emanating from each of these sub-groups of pixels is conducted through the beam splitter grid into a region which is assigned to this sub-group, from which region only the half-image reproduced by this sub-group is visible,
   the sub-groups of the pixels, on which respectively one of the half-images is reproduced, being chosen as a function of the detected eye positions such that the eyes of each of the at least two viewers are situated in two of the mentioned regions from which two mutually complementary stereoscopic half-images are visible;
   wherein the sub-groups are chosen such that a right eye of at least one of the viewers is situated in the same one of the mentioned regions as a left eye of another of the viewers.

2. The method according to claim 1, the plurality of different half-images being greater by one than a number of viewers whose eye positions are determined.

3. The method according to claim 1, with the exception of two of the regions from which precisely one of the half-images is visible, a right eye of one of the viewers and a left eye of another of the viewers being situated in each of these regions.

4. The method according to claim 1, at least two of the sub-groups being chosen such that respectively at least one pixel is blanked between adjacent image points from two different ones of these sub-groups.

5. The method according to claim 1, the pixels within the image points being actuated with an intensity which is weighted in addition to the image information such that intensity maxima and/or intensity concentrations are congruent with the eye positions.

6. The method according to claim 1, the eye positions being determined in that a head position of each of the viewers is detected and the eye positions of each of the viewers are derived from the head position of this viewer.

7. The method according to claim 6, a lateral movement of the eye positions of at least one of the viewers and/or a change in distance of the eye positions relative to the matrix screen being detected and the actuation of the pixels of the matrix screen being changed as a function of the lateral movement or the change in distance, in that limits of the sub-groups are moved such that the eyes of this viewer remain in the same regions.

8. The method according to claim 7, the stereoscopic half-images thereby being changed in that they are adapted to a perspective which is changed corresponding to the eye positions.

9. The method according to claim 1, the mentioned sub-groups on which the half-images are reproduced not including all of the pixels of the matrix screen and at least one other image which can be perceived by a further viewer being reproduced on the remaining pixels.

10. An autostereoscopic screen which is suitable for simultaneous display of a large number of views which are visible respectively from at least one of a plurality of viewing zones, comprising:
    a matrix screen having a plurality of pixels;
    a beam splitter grid which is disposed in front of the matrix screen and is designed to direct light emanating from the pixels respectively into at least one of the viewing zones;
    a device for determining respectively two eye positions of at least two viewers; and
    a control unit for actuating the matrix screen as a function of image information of a plurality of more than two mutually complementary stereoscopic half-images such that each of the half-images is reproduced with a large number of image points on one of different sub-groups of the pixels and in that light emanating from each of these sub-groups is conducted through the beam splitter grid into a region assigned to this sub-group, from which region only the half-image reproduced by this sub-group is visible,
    the mentioned plurality of half-images being smaller than the large number of views which the screen is able to display,
    and the control unit being designed by programming technology to choose the mentioned sub-groups during actuation of the matrix screen as a function of the detected eye positions such that the two eye positions of each of the at least two viewers are situated in two of the mentioned regions from which two mutually complementary stereoscopic half-images are visible;
    wherein the control unit is designed by programming technology to choose the sub-groups such that a right eye of at least one of the viewers is situated in the same one of the mentioned regions as a left eye of another of the viewers.

11. The screen according to claim 10, the control unit being designed by programming technology to actuate the matrix screen as a function of the detected eye positions such that, with the exception of two of the regions from which precisely one of the half-images is visible, a right eye of one of the viewers and a left eye of another of the viewers is situated in each of these regions.

12. The screen according to claim 10, the device for determining the eye positions is designed to detect a lateral movement of the eye positions of at least one of the viewers and/or a change in distance of the eye positions relative to the matrix screen, the control unit being designed by programming technology to change the actuation of the pixels of the matrix screen as a function of the detected lateral movement or the detected change in distance, in that limits of the sub-groups are moved such that the eyes of this viewer remain respectively in the same regions.

* * * * *